Figure 1:
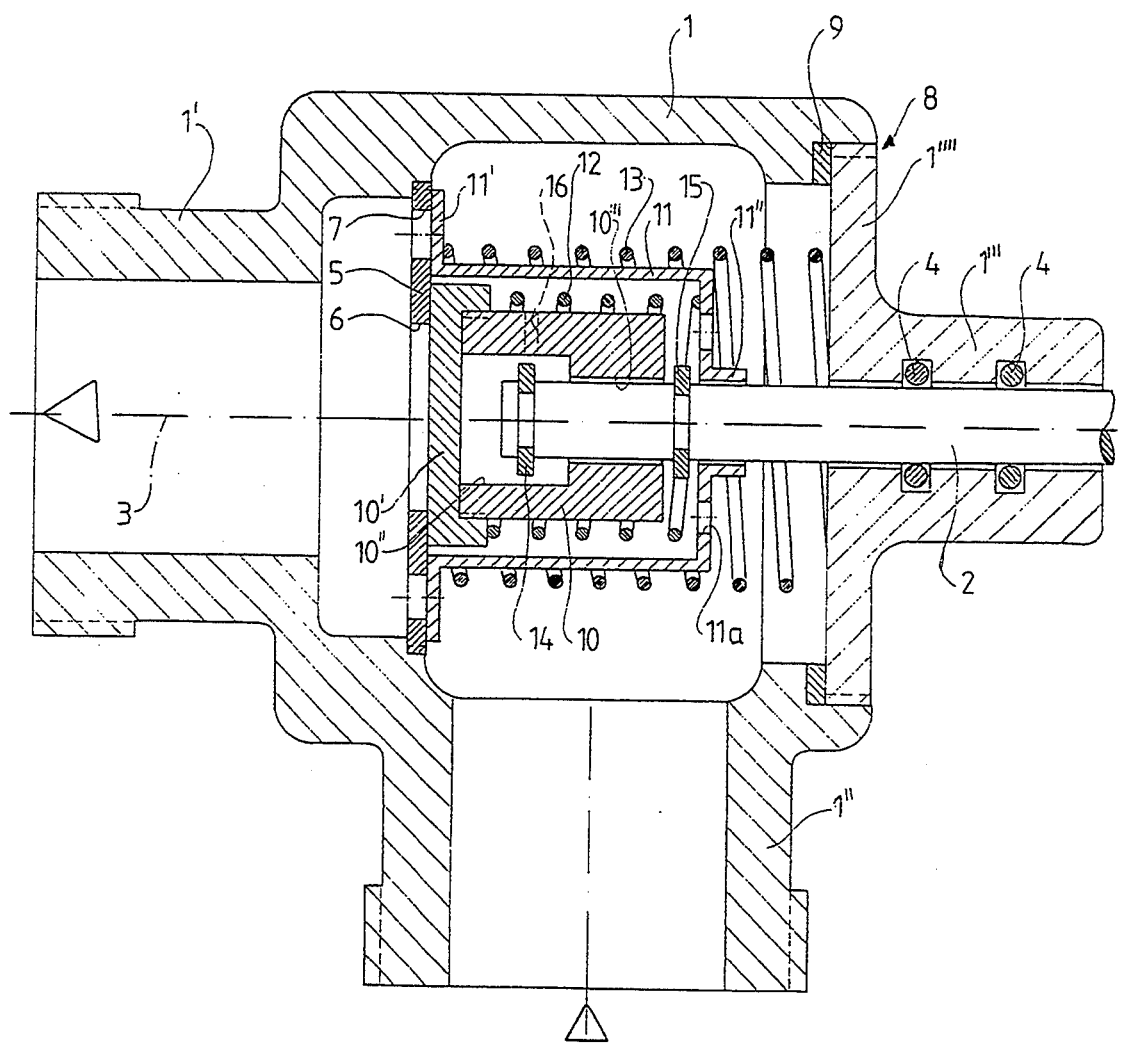

United States Patent [19]

Tengesdal

[11] Patent Number: 5,390,703
[45] Date of Patent: Feb. 21, 1995

[54] VALVE FOR FLOWING LIQUID-PHASE MEDIUM

[75] Inventor: Paul Tengesdal, Bjerkreim, Norway
[73] Assignee: Covent AS, Bjerkreim, Norway
[21] Appl. No.: 122,419
[22] PCT Filed: Mar. 27, 1992
[86] PCT No.: PCT/NO92/00051
  § 371 Date: Sep. 24, 1993
  § 102(e) Date: Sep. 24, 1993
[87] PCT Pub. No.: WO92/17721
  PCT Pub. Date: Oct. 15, 1992

[30] Foreign Application Priority Data

Apr. 4, 1991 [NO] Norway .................. 911310

[51] Int. Cl.⁶ ............................ F16K 11/16
[52] U.S. Cl. .................................. 137/629
[58] Field of Search ............. 137/629, 630.14, 630.15

[56] References Cited

FOREIGN PATENT DOCUMENTS 2223602 10/1974 France .................. 137/629

*Primary Examiner*—Robert G. Nilson
*Attorney, Agent, or Firm*—D. Peter Hochberg; Mark Kusner; Michael Jaffe

[57] ABSTRACT

A valve for a pipe system wherein liquid circulates is intended to be controlled dependent on the liquid temperature within the system by means of a thermostat adapted to actuate an electro magnet which, on its part, dependent on whether it is current-carrying or not, is adapted to retain the valve spindle in a position corresponding to open or closed valve position, respectively. The valve housing has plate-shaped seat body having a large central through-going flow opening and a number of smaller corresponding openings closer to the circumference. A spring-loaded first valve body is displaceably arranged on the spindle and cooperates with the central opening of the seat body in order to close/open the opening, a concentrical, spring-loaded hollow piece constituting a second valve body which also is displaceably arranged on the spindle cooperating with the peripheric openings via an annular flange portion in order to close/open the last-mentioned openings. The two valve bodies are axially displaceable in relation to each other, and they are each assigned a carrier on the spindle.

6 Claims, 5 Drawing Sheets

VALVE FOR FLOWING LIQUID-PHASE MEDIUM

The present invention relates to a valve for flowing liquid-phase media, especially for use in refrigerating plants or heating plants, respectively, based on the supply of refrigerated or heated liquid, respectively.

For the purpose of refrigerating or heating, respectively, a flowing liquid having a temperature adapted to the purpose in question is supplied to a refrigerating or heating plant, respectively. Usually, the liquid is supplied via a shunt valve adjusted by means of an electric motor.

A shunt valve assigned an adjusting electric motor represent an expensive solution, i.a. because the electric motor has to be equipped with a gear device for gearing-down, which means that one, in addition to the electric motor as such, must have a gear device or another transmission means. Likewise, such known plants require complex adjusting equipment for the purpose of supplying the necessary pulses to the electric motor regarding the valve≈s degree of opening.

In prior art technique, one cannot use a ordinary thermostat to control said electric motor, because a thermostat only emits a on/off-signal.

Another disadvantage in normally used shunt valves is that the throttle means within the valve has to be adapted to every pipe dimension in order to achieve the correct valve characteristics.

Therefore, a main object of the present invention is to provide a substantially simplified and improved valve/-regulator-assembly, i.e. a valve having an adjusting/-closing device, wherein the valve may be controlled by means of a thermostat in combination with an electro magnet. This means that one, according to the invention, uses the most simple adjusting equipment known, namely a thermostat emitting an on/off-signal to an electro magnet effecting the actuation of the valve. This represents a very simple and inexpensive solution.

In accordance with the invention, said objects are realized in designing the valve such that it exhibits the features appearing from the following claims.

Figure 2:
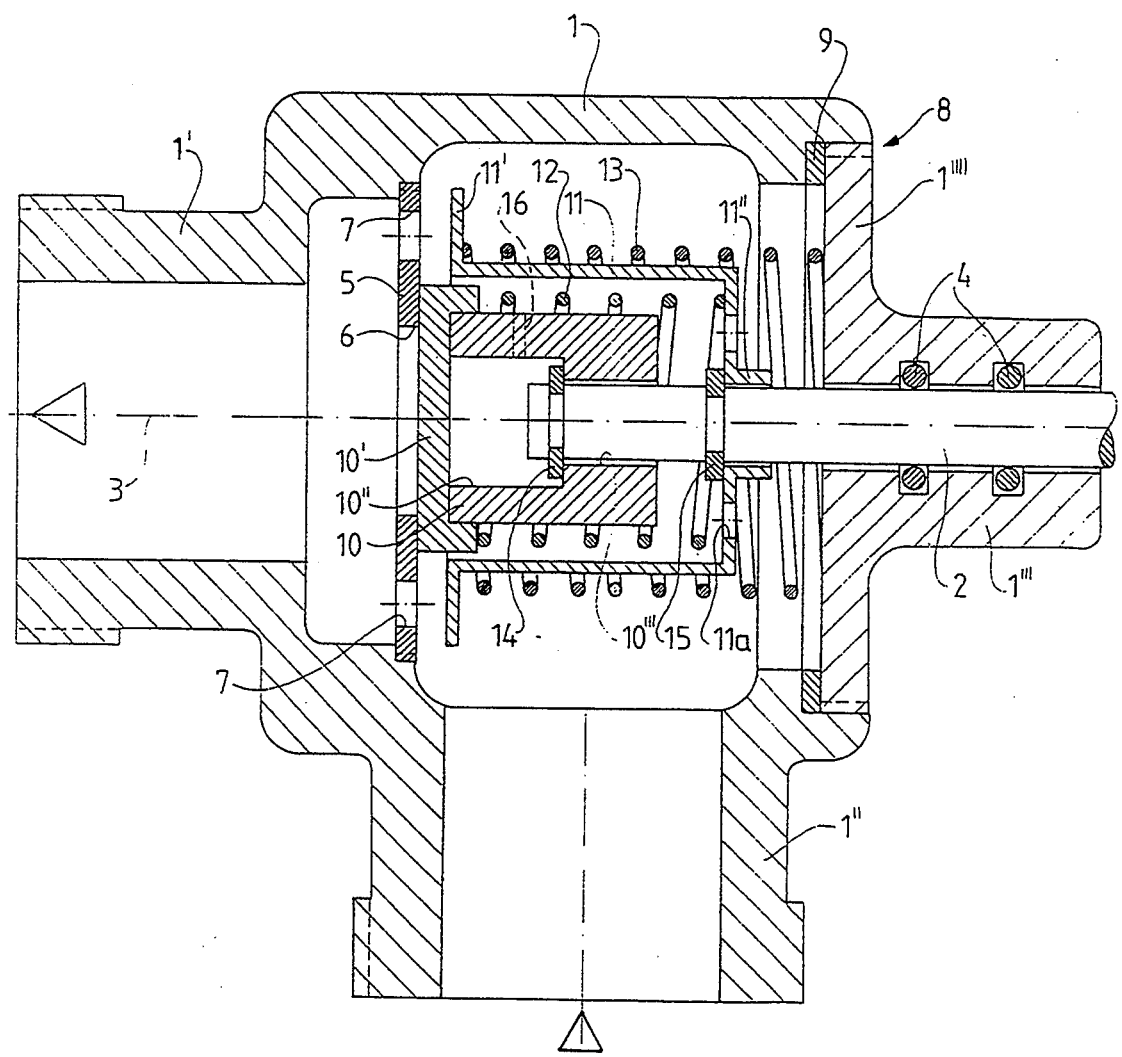
Figure 3:
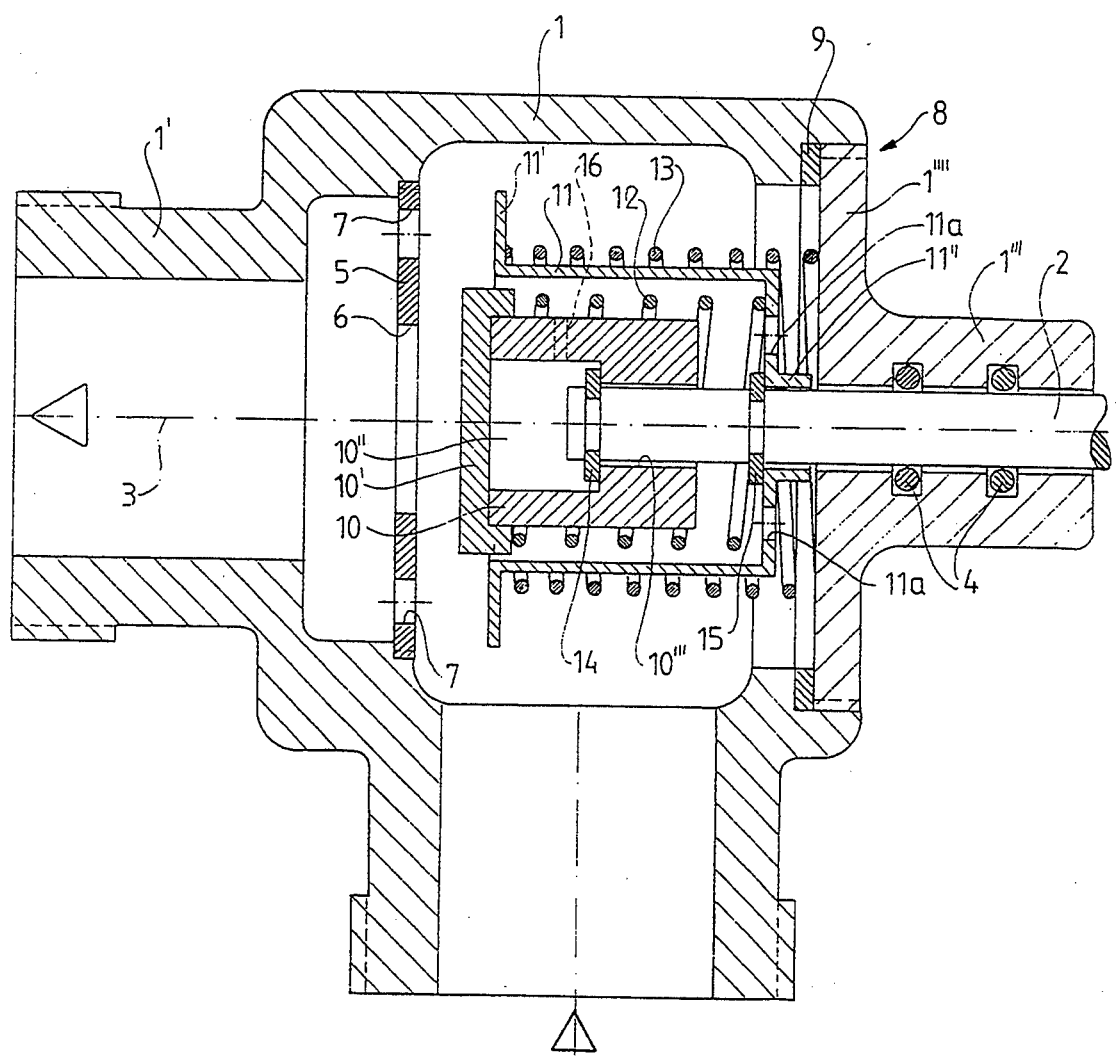
Figure 4:
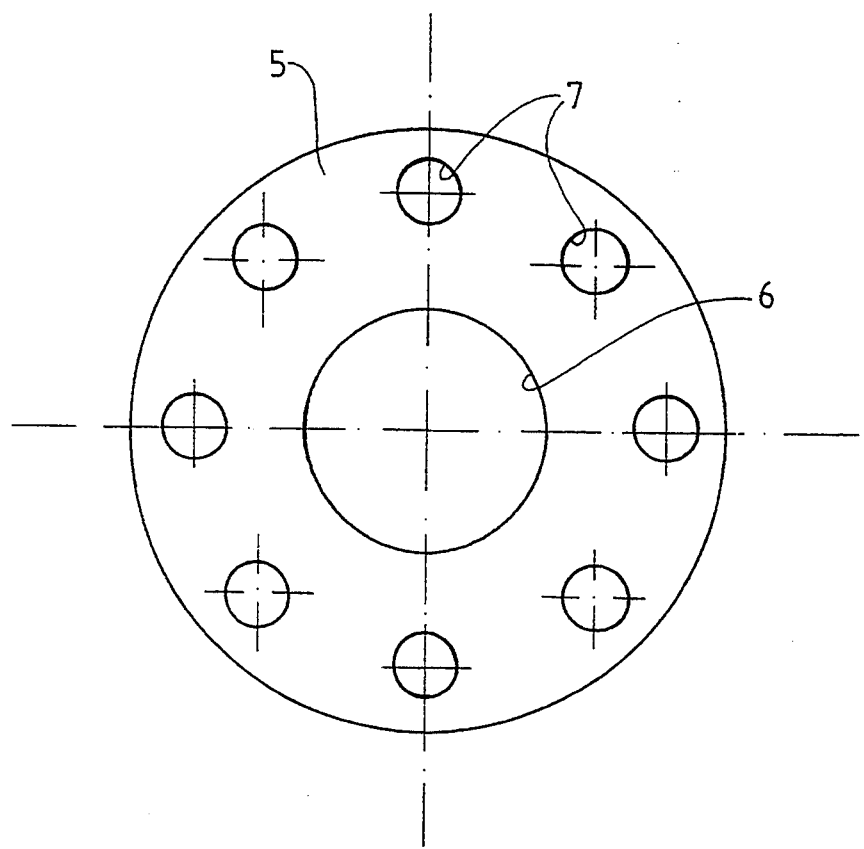
Figure 5:
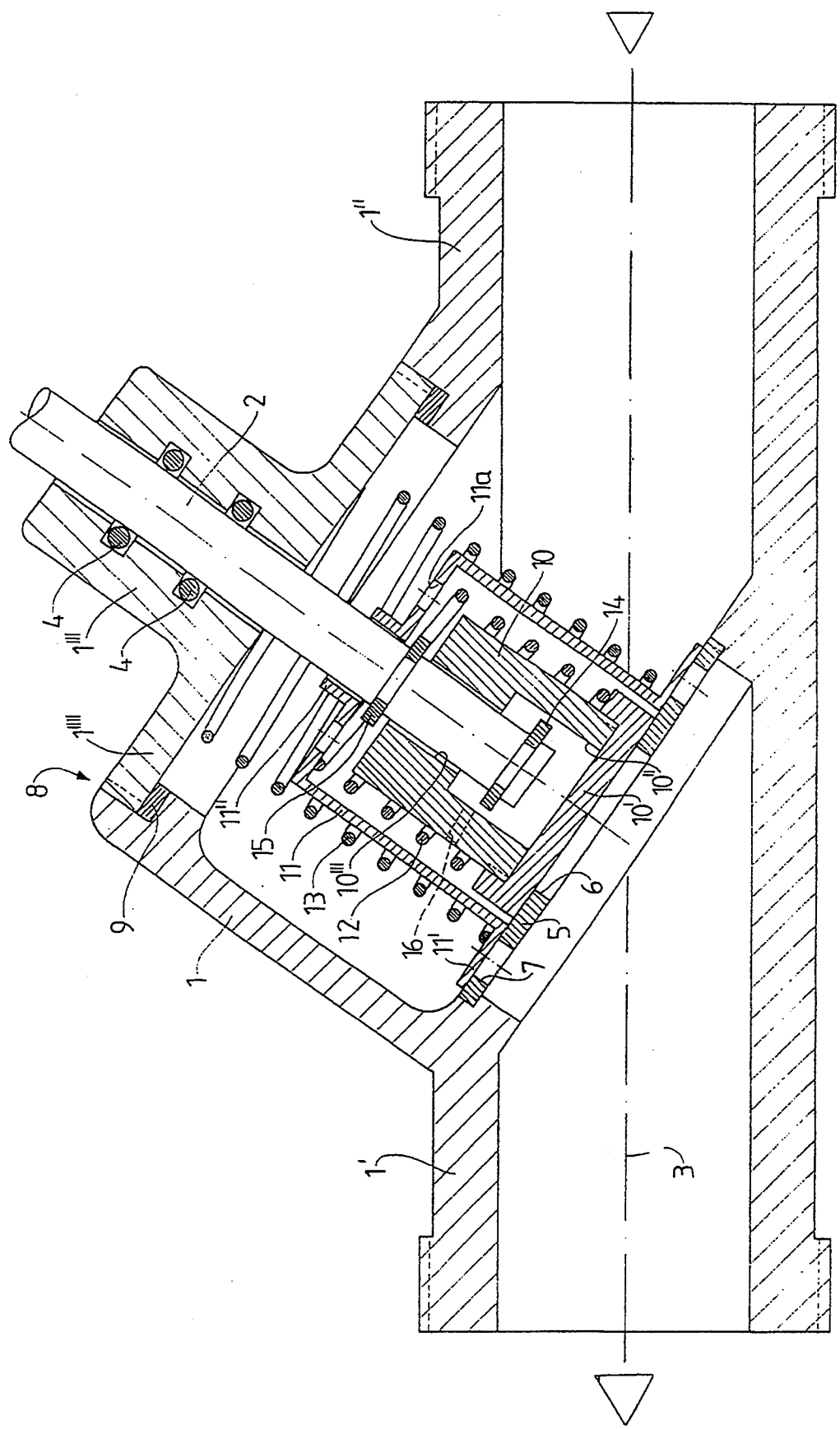

An example of a suitable embodiment is shown in the accompanying drawings, wherein:

FIGS. 1-3 show axial sections through the valve housing, illustrating the valve bodies in mutually differing positions, FIG. 1 shows the valve in a closed position, FIG. 2 shows the valve in a partly open intermediate position between closed and open position, FIG. 3 shows the valve in an entirely open position; and FIG. 4 shows a perforated valve seat plate having a central flow opening and peripheric flow openings for the liquid flowing through;

FIG. 5 shows an axial section corresponding to FIGS. 1-3 through a valve according to a somewhat modified embodiment wherein the longitudinal axis of the valve housing forms an angle in relation to the common axis of the inlet and the outlet. The spindle carrying the valve bodies and the valve seat form an acute angle in relation to the general flow direction of the liquid-phase medium. Otherwise, this embodiment is designed exactly according to the same principles as the embodiment of the preceding figures, and identical reference numerals have been used; the embodiment according to FIG. 5 should, therefore, not need to be further disclosed in the following.

In the various figures of the drawing, the general flowing direction of the liquid-phase medium has been indicated through arrow heads.

In order to explain the constructional features of the valve, reference is first made to FIGS. 1 and 4, the same features appearing from FIG. 5, showing an embodiment best suited to be mounted into a straight pipe line.

Reference numeral 1 denotes a valve housing having two tubular connecting pieces 1" and 1' for the valve's inlet and outlet, the axis of said inlet and that of said outlet—according to FIGS. 1-3—being positioned to cross each other perpendicularly; said axes coinciding according to FIG. 5. Thus, the directional extent of the inlet 1" in relation to the outlet 1' is not critical for the invention.

A sleeve-shaped housing portion 1'" establishes a guide for a valve spindle 2, coaxial to one tubular connecting piece 1'; reference numeral 3 denoting the axis of the valve. Later terms such as "axial" and "radial" refer everywhere to the axis 3 of the valve. Around the spindle 2, O-rings 4 extend peripherically, said O-rings 4 being accommodated within internal circumferential grooves of the sleeve portion 1'".

At the inner end of the tubular connecting piece 1' the valve housing 1 is provided with a radially directed perforated plate 5 constituting the seat of the valve. At the circumference, this seat plate 5 may be screwed to the adjacent internal housing portion, or the plate 5 may be attached to the housing 1 in another suitable way.

The seat plate 5 is formed with a plurality of axial flow openings, namely a large central opening 6 and, according to the embodiment shown, confer FIG. 4, eight smaller openings 7 distributed according to mutually equal angular spacings along a circle concentrical to the circular circumference of the seat plate. The shape of the openings and their mutual size relationship as well as the positioning thereof may be varied and modified substantially within the scope of the invention. However, it represents a practical solution to position one 6 of the openings 6,7 centrally and to dimension the same such that it exhibits an opening area exceeding the remaining openings, but such a solution does not represent a binding precondition for the achievement of the intentional effect. Possibly, an oblong shape may be imparted to the peripheric openings 7, the larger hole dimension being in the peripheric direction, and their flow area may be reduced or increased, e.g. for the adaption to the field of application, the liquid's speed of flow, etc.

The spindle-guiding sleeve portion 1'" of the valve housing 1 is formed integrally with an annular flange 1"" which, together with the sleeve portion 1'", forms the end cover of the valve housing 1, said cover enabling opening of the housing and being screwed to the remaining housing body at 8; 9 denoting a seal.

The valve spindle 2 is, at the end thereof not shown, connected to an electro magnet not shown adapted to actuate the valve whenever the magnet becomes actuated by means of a thermostat. At the other end thereof, the spindle 2 carries a first valve body consisting of a hollow piece 10 having a screwed-on plate-shaped gable piece 10' intended to be brought to rest sealingly against the seat plate 5, in order to close the central flow opening 6 thereof. This first valve body 10,10' has a limited axial displaceability in relation to the spindle, this being further explained later on. Temporarily, it should only be mentioned that the first valve body 10,10' has an axially restricted, circular-cylindrical cavity 10" as well as a coaxial guiding bore 10'''.

Likewise, the valve spindle 2 carries a second valve body constituted by a cylindrical cup-shaped hollow piece 11 having an outwardly directed annular flange 11' adapted to come into a position resting sealingly against the seat plate 5, thereby closing the peripheric flow openings 7, as well as a radial "cup bottom portion" which centrally passes into a short guiding sleeve portion 11". In the radial bottom portion of the second valve body 11,11',11", axial through-going holes 11a have been formed for the sake of compensation of pressure, so that the internal and external pressures of the second valve body correspond to each other at all times. The purpose of said compensation of pressure associated to the second valve body will be expained later on.

The first as well as the second valve body 10,11 are each assigned a special pressure spring 12 and 13, respectively. The pressure spring 12 for the first valve body 10 supports itself at one end against the inner side of the gable piece and, at the other end thereof, supports itself against the inner side of the valve body's 11 bottom piece; the pressure spring 13 for the second valve body 11 supporting itself, at one end thereof, against the annular flange 11' and, at the other end, against the inner side of the valve housing's 1 end piece.

Reference numerals 14 and 15 denote two rings locked to the valve spindle 10 at spaced locations, the ring 14 functioning as a carrier for the first valve body 10 and the ring 15 as a carrier for the second valve body 11 whenever one valve body or the other is displaced from closed toward open valve position.

As mentioned, the first valve body 10 has a guiding bore 10''' in the area of the spindle 2. In order to evacuate liquid within the cavity 10", there should either be sufficient clearance between spindle and valve body in the area of the bore 10''', or a radial bore 16—dotted lines in FIGS. 1–3—may be formed through the wall of the valve body 10.

FIG. 1 shows the valve in a closed position wherein the the gable piece 10' of the first valve body 10 rests sealingly against the seat plate 5, closing the central flow opening 6 thereof, the annular flange 11' of the second valve body likewise resting sealingly against the seat plate 5, closing the peripheric flow openings 7 thereof.

One imagines that this valve is coupled into a closed circuit system wherein a centrifugal pump rotates without liquid supply when the valve is closed.

Thereby, a pressure difference over the openings 6 and 7 of the plate 5 will arise. As previously mentioned, the second valve body 11 is perforated at 11a so that the same pressure prevails within the hollow piece 11 as well as within the valve housing 1 surrounding said hollow piece constituting the second valve body 11.

If measures have not been effected in order to establish such a compensation of pressure, one would have had to overcome closing forces both at the central opening 6 and at the peripheric openings 7 when withdrawing the second valve body 11 from closed to open valve position. This is not necessary due to the compensation of pressure caused by the holes 11a. Thus, when the second valve body 11 is to be withdrawn to open valve position, one only has to overcome the pressure difference at the peripheric holes 7 whenever the spindle is actuated by means of the electro magnet, not shown, which has been actuated by means of a thermostat coupled into the flow path for the cold/warm liquid flowing within the circuit system. In addition to said pressure difference at the peripheric holes 7, one has to overcome the pressure force of the spring 13. However, this spring may be made rather weak, the only task thereof being to prevent the second valve body 11 from resting to loosely against the seat plate 5 via the annular flange 11' of the former.

FIG. 2 shows the valve in an intermediate position, wherein the valve spindle 2 by said electro magnet has been displaced an initiating distance to the right, whereby the ring 15 thereof has pulled with it the second valve body 11 which radially is positioned externally of the first valve body 10, so that the sealing engagement between the annular flange 11' and the seat plate 5 has been brought to an end; the peripheric flow openings 7 of the seat ring 5 being uncovered, while the first, radially inner valve body 10 still closes the central flow opening 6 by means of the gable piece 10' thereof.

In this intermediate position, the peripheric openings 7 are fully opened, and the pressure is then balanced between the two sides of the plate 5, i.e. only a rather small force is required to move the first valve body 10 toward open valve position; only a pressure force slightly exceeding that of the spring 12 has to be overcome.

Upon further axial displacement to the right, the ring 14 of the spindle 2 takes with it the first valve body 10.

Thereby, full opening of the valve has been achieved, FIG. 3.

Now, reference is made to the previous account relating to the seat plate 5. Additionally, it should be stated that a large central flow opening 6 and smaller peripheric flow openings have been found to give a very good flowing pattern for the liquid passing through the valve.

Whenever said thermostat records that the desired liquid temperature has been achieved in the circuit system whereinto the valve according to the invention has been coupled, the thermostat emits a puls to said electro magnet actuating the valve spindle 2, and the current to the magnet is disconnected. Thereby, the valve spindle 2 will be pushed axially in the direction toward the seat plate 5 by means of the pressure spring 13 as well as by the by-passing liquid exerting a suction pressure on both first and second valve bodies 10,11, whereby the first, radially inner valve body 10 is moved to closed position, so that the central opening 6 of the seat plate 5 is closed, FIG. 2.

Then, the liquid flow through the valve will be throttled during its passage through merely the peripheric openings 7. The liquid's speed of flow will then increase in relation to that associated to full flow area, and one will not experience any undesired stroke within the piping; such strokes could have arisen upon the establishment of a complete closure/opening momentarily in one and the same operation. This throttling effect causes a very advantageous damped liquid flow.

The second, radially outer valve body 11 is thereafter closed slowly due to the fact that liquid within the cavity 10" has to be displaced via the annulus at 10''' along the spindle 2; the spindle 12 then being capable of moving further to the left according to FIG. 2. As previously mentioned, a radial bore 16 may be formed through the wall of first valve boldy 10 in order to evacuate liquid from the cavity 10", said bore 16 being shown in dotted lines as an alternative partial solution in FIGS. 1–3. It is the dimensions of the cavity 10''' and/or the radial bore 16, respectively, that decide at which speed the second, radially outer valve body 11 is brought to close, the valve spindle 2 thereunder pressing some of the liquid within the cavity 10" out prior to the complete closure of the valve, i.e. that the ultimate closure phase secures slow closing movements, not giving rise to undesired strokes within the system.

I claim:

1. A valve for a flowing liquid-phase medium, said valve comprising a valve housing having an inlet and an outlet as well as a seat body having at least one flow opening for liquid defined within a central area thereof, a first spring-loaded valve body disposed on an axially displaceable valve spindle being adapted to cooperate with said at least one flow opening, in order to close or open, respectively, the latter, dependent on the axial displacement position of said valve spindle, said seat body, radially outwardly of said central area wherein said at least one flow opening is located, is formed with at least one further flow opening for liquid, and that said at least one further flow opening is adapted to be closed and opened, respectively, by means of a second valve body disposed on said spindle, said second valve body being spring-loaded and being constituted through a substantially hollow body surrounding said first valve body, said first and second valve bodies being relatively displaceably disposed on said spindle, said spindle being provided with carrier means for said first and second valve bodies, respectively, said first valve body being formed with a cavity in liquid-communication with the interior of said valve housing through at least one throttle opening, said spindle penetrating with a free end portion into said cavity, said spindle's penetration depth into said cavity varying in size as the valve changes from open to closed position, and vice versa, said penetration depth increasing whenever said spindle is being displaced corresponding to said valve's positional change from an open position toward a closed position, said spindle during the displacement thereof in the last-mentioned direction displacing liquid from said cavity out through said throttle opening, simultaneously effecting a damping braking of said spindle during a completion phase of the displacement thereof toward a completely closed valve position.

2. A valve as set forth in claim 1, wherein said second valve body substantially has the shape of a cup, concentrically surrounding said first valve body, and comprising a central bearing sleeve portion, with which the former may slide along said spindle, as well as a flange-annular closure portion, with which said second valve body may rest sealingly against said seat body, closing said at least one further flow opening in one axial displacement position along said spindle, a wall of a hollow piece forming said second valve body being perforated, in order to establish and maintain equal pressure internally and externally of said second valve body.

3. A valve as set forth in claim 2, wherein said first valve body is assigned a pressure spring adapted to urge said first valve body toward a closing position, said pressure spring resting supportingly against a shoulder of said first valve body and, at the other end thereof, against a radially directed internal portion of said second valve body, oppositely located in relation to the second valve body's closing end.

4. A valve as set forth in claim 3, wherein said second valve body is assigned a relatively weak pressure spring adapted to urge said second valve body toward closing position, said relatively weak pressure spring, at one end thereof, resting supportingly against a shoulder disposed at the closure end of said second valve body and, at the other end thereof, against an internal face of a radially directed wall of said valve housing.

5. A valve as set forth in claim 4, wherein said carrier means on said spindle is comprised of fixed rings, one of said rings located at each side of said first valve body's bearing portion on said spindle, said fixed rings having a mutual spacing exceeding the axial longitudinal extent of said bearing portion.

6. A valve as set forth in claim 5, wherein one of said fixed rings which is intended to cooperate with said first valve body during the displacement of the latter from closed toward open position, is attached to said spindle at the end thereof and disposed within said cavity.

* * * * *